United States Patent
Wang

(10) Patent No.: US 8,203,658 B2
(45) Date of Patent: Jun. 19, 2012

(54) SCREEN PROTECTING ASSEMBLY FOR ELECTRONIC DEVICE

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 699 days.

(21) Appl. No.: 12/347,342

(22) Filed: Dec. 31, 2008

(65) Prior Publication Data

US 2010/0067177 A1    Mar. 18, 2010

(30) Foreign Application Priority Data

Sep. 16, 2008    (CN) .......................... 2008 1 0304497

(51) Int. Cl.
  *H04N 5/64*    (2006.01)
(52) U.S. Cl. ...................... 348/841; 348/836; 242/598.3
(58) Field of Classification Search ................... 242/598, 242/598.3, 599, 599.3; 348/836–843; 160/23.1, 160/133, 265, 273.1, 298, 323.1
  See application file for complete search history.

(56) References Cited

U.S. PATENT DOCUMENTS

| | | | | |
|---|---|---|---|---|
| 105,871 A * | 7/1870 | Wilhelm | ........................ | 160/298 |
| 730,444 A * | 6/1903 | Duohemin | ..................... | 464/184 |
| 810,606 A * | 1/1906 | Ball | ............................. | 242/598.2 |
| 1,261,390 A * | 4/1918 | Hoyt | .............................. | 160/292 |
| 1,286,599 A * | 12/1918 | Tabrah | ........................... | 242/565 |
| 1,289,017 A * | 12/1918 | Johnson | ......................... | 242/565 |
| 1,372,301 A * | 3/1921 | Kopp | .............................. | 384/425 |
| 1,734,769 A * | 11/1929 | Hadden | ......................... | 160/387 |
| 1,955,489 A * | 4/1934 | Duncan et al. | ............. | 242/598.4 |
| 1,967,676 A * | 7/1934 | Marchev | .................... | 242/596.4 |
| 2,046,550 A * | 7/1936 | Daniels | ....................... | 242/486.2 |
| 2,520,618 A * | 8/1950 | Winter | .......................... | 160/315 |
| 2,546,820 A * | 3/1951 | Grant | ........................... | 242/599.1 |
| 2,668,586 A * | 2/1954 | Luckie | .......................... | 160/241 |
| 2,714,404 A * | 8/1955 | Cadorette et al. | ............. | 139/304 |
| 2,858,994 A * | 11/1958 | Sarro | ............................ | 242/599 |
| 3,703,996 A * | 11/1972 | Ulseth | ........................... | 242/599 |
| 4,002,238 A * | 1/1977 | Cameron et al. | .............. | 206/408 |
| 4,372,432 A * | 2/1983 | Waine et al. | ................ | 192/223.4 |
| 4,373,569 A * | 2/1983 | Barettella | ..................... | 160/263 |
| 4,779,662 A * | 10/1988 | Wilk | .............................. | 160/321 |
| 5,036,898 A * | 8/1991 | Chen | ............................ | 160/23.1 |
| 5,138,462 A * | 8/1992 | Skovgaard | ..................... | 348/836 |
| 5,264,765 A * | 11/1993 | Pecorino et al. | .............. | 318/265 |

(Continued)

FOREIGN PATENT DOCUMENTS

CN    2612184 Y    4/2004

(Continued)

*Primary Examiner* — Robert Canfield
*Assistant Examiner* — Charissa Ahmad
(74) *Attorney, Agent, or Firm* — Altis Law Group, Inc.

(57) ABSTRACT

A screen protecting assembly for an electronic device includes a pivot shaft, a cushion, and two connecting subassemblies positioned on the electronic device. Each connecting subassembly has a base and a rotating member rotatably received in the base. The rotating member engages with the pivot shaft. The cushion coils on the pivot shaft. When the rotating member is rotated in a first direction, the cushion unfolds to cover a screen of the electronic device. When the rotating member is rotated in a second direction opposite to the first direction, the cushion coils on the pivot shaft so that the screen of the electronic device is exposed.

6 Claims, 4 Drawing Sheets

U.S. PATENT DOCUMENTS

| | | | |
|---|---|---|---|
| 5,374,008 A * | 12/1994 | Halvorson et al. | 242/598.3 |
| 5,375,643 A * | 12/1994 | Rude | 160/321 |
| 5,464,052 A * | 11/1995 | Wieczorek et al. | 160/23.1 |
| 5,669,432 A * | 9/1997 | Nisenson et al. | 160/307 |
| 6,056,233 A * | 5/2000 | Von Schenk | 242/594.5 |
| 6,158,563 A * | 12/2000 | Welfonder et al. | 192/223.3 |
| 6,901,987 B1 * | 6/2005 | Graham | 160/121.1 |
| 6,994,409 B2 * | 2/2006 | Godlewski | 312/297 |
| 7,003,814 B2 * | 2/2006 | Kamysz et al. | 4/243.2 |
| 7,717,156 B2 * | 5/2010 | Costello et al. | 160/317 |
| 7,909,083 B2 * | 3/2011 | Debert et al. | 160/238 |
| 8,070,660 B2 * | 12/2011 | Seidel | 492/15 |
| 2001/0011579 A1 * | 8/2001 | Davies et al. | 160/23.1 |
| 2004/0216849 A1 * | 11/2004 | Goldenberg et al. | 160/23.1 |
| 2005/0109871 A1 * | 5/2005 | Mitchell et al. | 242/590 |
| 2006/0231215 A1 * | 10/2006 | Loo | 160/133 |
| 2006/0284001 A1 * | 12/2006 | Paradise et al. | 242/597.4 |
| 2007/0051475 A1 * | 3/2007 | Wieczorek et al. | 160/24 |
| 2007/0051478 A1 * | 3/2007 | Wieczorek et al. | 160/323.1 |
| 2007/0084572 A1 * | 4/2007 | Davenport et al. | 160/370.22 |
| 2008/0006373 A1 * | 1/2008 | Lin | 160/321 |
| 2008/0121353 A1 * | 5/2008 | Detmer et al. | 160/266 |
| 2009/0127369 A1 * | 5/2009 | Mullet et al. | 242/379 |

FOREIGN PATENT DOCUMENTS

| | | | |
|---|---|---|---|
| CN | 101312516 A | * | 11/2008 |
| CN | 201197177 Y | * | 2/2009 |
| DE | 3534628 A1 | * | 4/1987 |

* cited by examiner

SCREEN PROTECTING ASSEMBLY FOR ELECTRONIC DEVICE

BACKGROUND

1. Field of the Disclosure

The present disclosure generally relates to display protection assemblies for the electronic devices and, particularly, to a screen protecting assembly for the electronic device with liquid crystal display screen.

2. Discussion of the Related Art

Liquid crystal display (LCD) screens are widely used in various electronic devices. Since the electronic devices are generally exposed to the environment, dust deposits on the LCD screens. In addition, the LCD screens are easy to be scratched. Therefore, electronic devices with LCD screens generally need to have a screen protection. Currently, the electronic devices are packaged with plastic films to protect the LCD screens when the electronic devices is not being used.

However, a user needs to repeatedly remove and place the plastic films off and on from the LCD screens. Therefore, the plastic films are inconvenient.

Therefore, screen protecting assembly for an electronic device which overcomes the above-described shortcomings is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
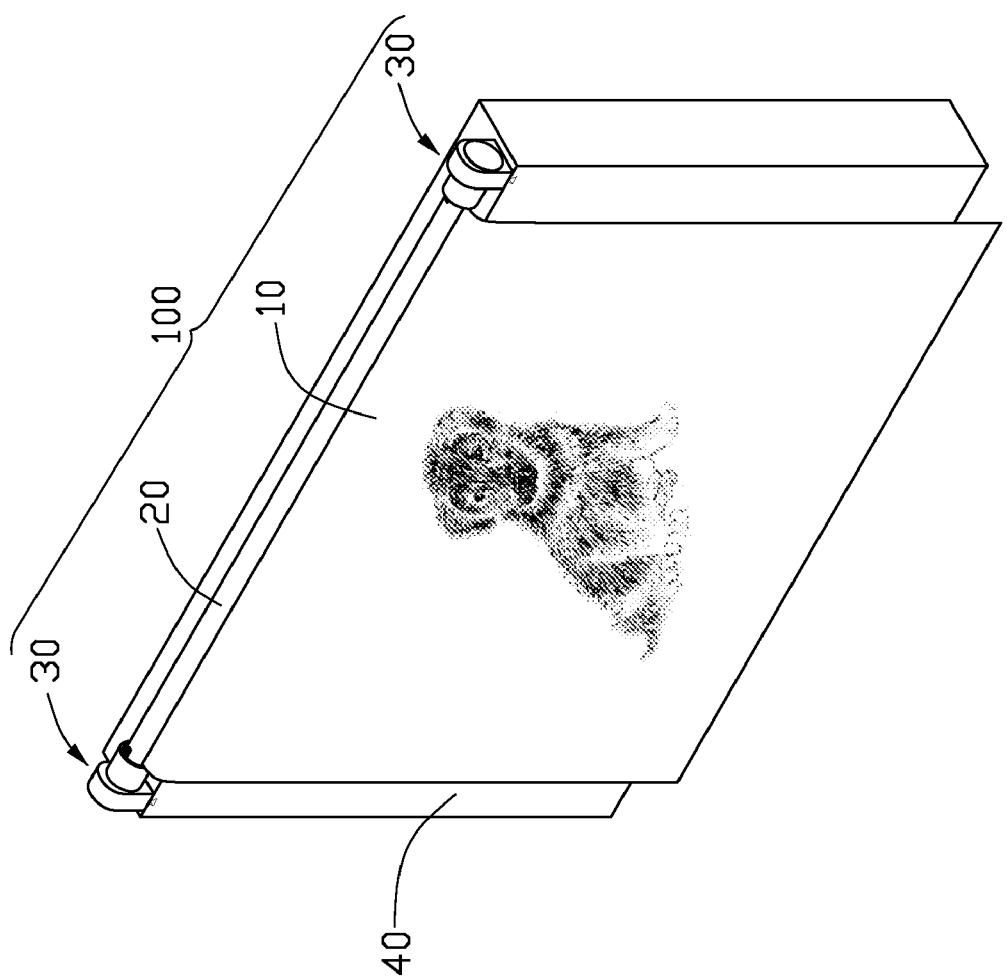
FIG. 1 is an assembled, isometric view of a first embodiment of a screen protecting assembly positioned on an electronic device, the electronic device including a curtain, a pivot shaft, and two connecting subassemblies.

Referring to FIG. 1, a first embodiment of a screen protecting assembly 100 for an electronic device 40 includes a curtain 10, a pivot shaft 20, and two connecting subassemblies 30. The connecting subassemblies 30 are positioned on opposite ends of a side of the electronic device 40. The curtain 10 coils on the pivot shaft 20. Opposite ends of the pivot shaft 20 are connected to the connecting subassemblies 30. In the illustrated embodiment, the curtain 10 may be a picture or a photograph.

Figure 2:
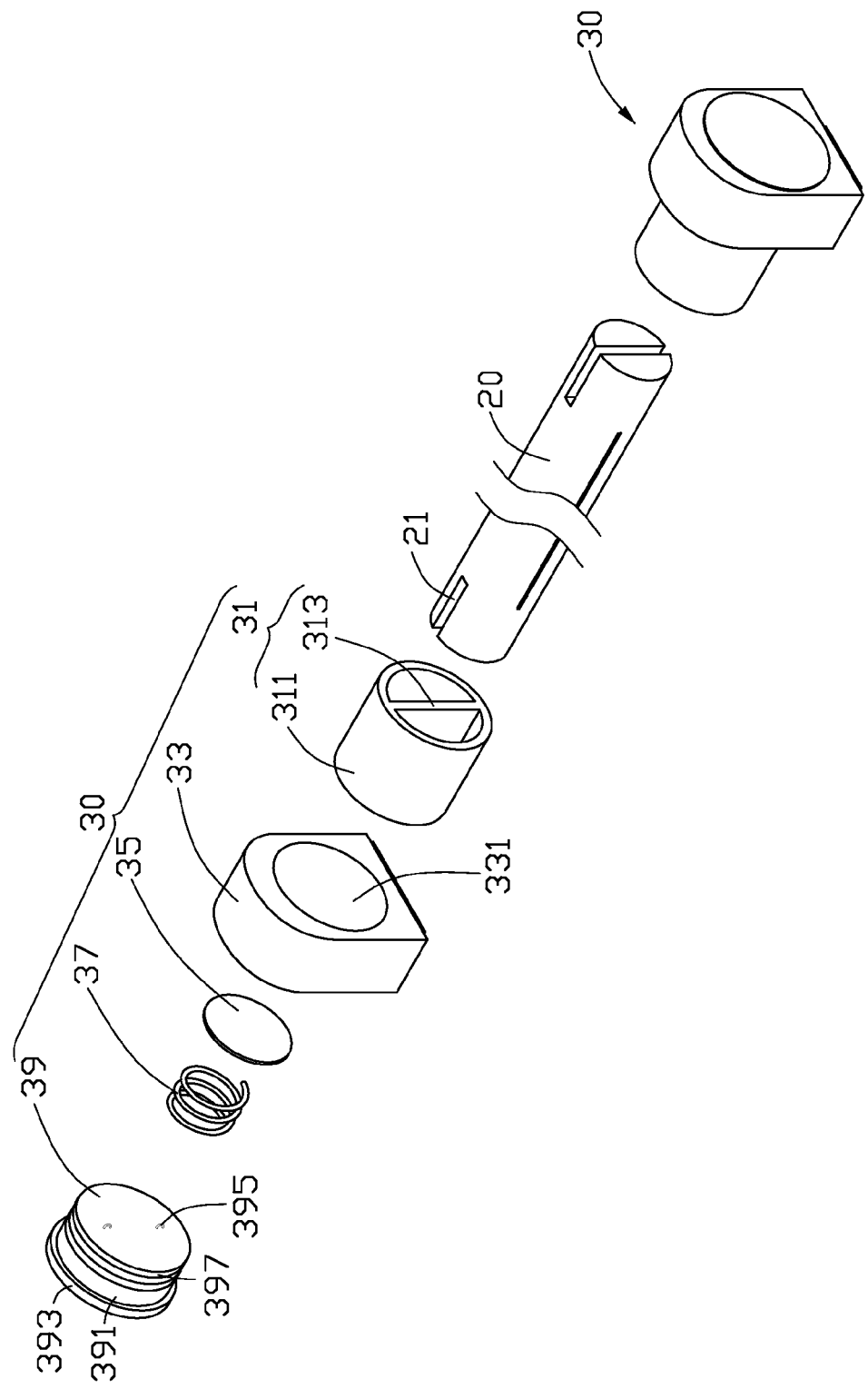
FIG. 2 is an exploded, isometric view of the screen protecting assembly of FIG. 1, without the curtain.

Referring to FIG. 2, the pivot shaft 20 defines two first positioning portions 21 on opposite ends. In the illustrated embodiment, the pivot shaft 20 is substantially cylindrical shaped, and the first positioning portions 21 are substantially rectangular cutouts.

Each connecting subassembly 30 includes a rotating member 31, a base 33, a resisting member 35, an elastic member 37, and a fastening member 39. The rotating member 31 includes a sleeve 311 and a second positioning portion 313 formed in the sleeve 311. The base 33 is positioned on the electronic device 40, and defines a circular assembling hole 331 in a center portion. Two hooks (not shown) are formed on a side surface of the resisting member 35. The fastening member 39 includes a main body 391 and a flange 393 formed on an end of the main body 391. The main body 391 forms two hooks 395 on an end away from the flange 393. The cylindrical surface of the main body 391 defines a threaded portion 397. In the illustrated embodiment, the second positioning portion 313 is a positioning piece, the main body 391 is substantially cylindrical shaped, the elastic member 37 is a compression spring.

Referring to FIGS. 1 and 2, in assembling the screen protecting assembly 100 to the electronic device 40, each connecting subassembly 30 is firstly assembled as follows. An end of the elastic member 37 engages with the hooks of the resisting member 35, and the other end of the elastic member 37 engages with the hooks 395 of the fastening member 39. Thus, the elastic member 37 can be steadily positioned between the resisting member 35 and the fastening member 39 to produce an elastic force along an axis of the fastening member 39 when the elastic member 37 is compressed. The threaded portion 397 of the fastening member 39 engages with the assembling hole 331 of the base 33, and the elastic member 37 and resisting member 35 are received in the assembling hole 331. The rotating member 31 is inserted into the assembling hole 331 of the base 33. After the connecting subassemblies 30 are assembled, the connecting subassemblies 30 are positioned on opposite sides of a top of the electronic device 40. The curtain 10 wraps around the pivot shaft 20. The opposite ends of the pivot shaft 20 are assembled to the rotating member 31 of each connecting subassembly 30 as follows. The second positioning portion 313 of each rotating member 31 engages in the first positioning portions 21 of the pivot shaft 20, thus non-rotatably connecting the pivot shaft 20 to the rotating member 31. The elastic member 37 of each connecting subassembly 30 is then compressed, so that the elastic member 37 produces an elastic force along an axis of the pivot shaft 20.

When the electronic device 40 is not in use, the pivot shaft 20 is rotated in a first direction by an external force, so that the protective screen 10 is unrolled to cover a screen (not shown) of the electronic device 40. Thus, the screen can be kept clean from dust deposits and protected from damage such as scratches. In addition, the electronic device 40 with the curtain 10 has a good appearance because the curtain 10 is configured with an art or an image. When the electronic device 40 needs to be used, the pivot shaft 20 is rotated in a second direction opposite to the first direction by an external force, so that the curtain 10 rolls up on the pivot shaft 20, thereby exposing the screen of the electronic device 40. Since the elastic member 37 is positioned in each base 33, a length of the rotating member 31 received in the base 33 is adjustable. Therefore, when one end of the pivot shaft 20 engages with the rotating member 31 of one connecting subassembly 30, the other end of the pivot shaft 20 is easily assembled to the rotating member 31 of the other connecting subassembly 30.

It should be pointed out that the resisting member 35, the elastic member 37, and the fastening member 39 may be omitted, in which case, the base 33 is elastic and defines an assembling groove for rotatably receiving the pivot shaft 20. The sleeve 311 and the second positioning portion 313 can be manufactured separately and assembled together. In addition, a driving rod may be formed on the rotating member 31, so that the pivot shaft 20 can be rotated by pushing the driving rod. Moreover, the fastening member 39 may define more than two hooks or only one hook, and the resisting member 35 may also define more than two hooks or only one hook.

Figure 3:
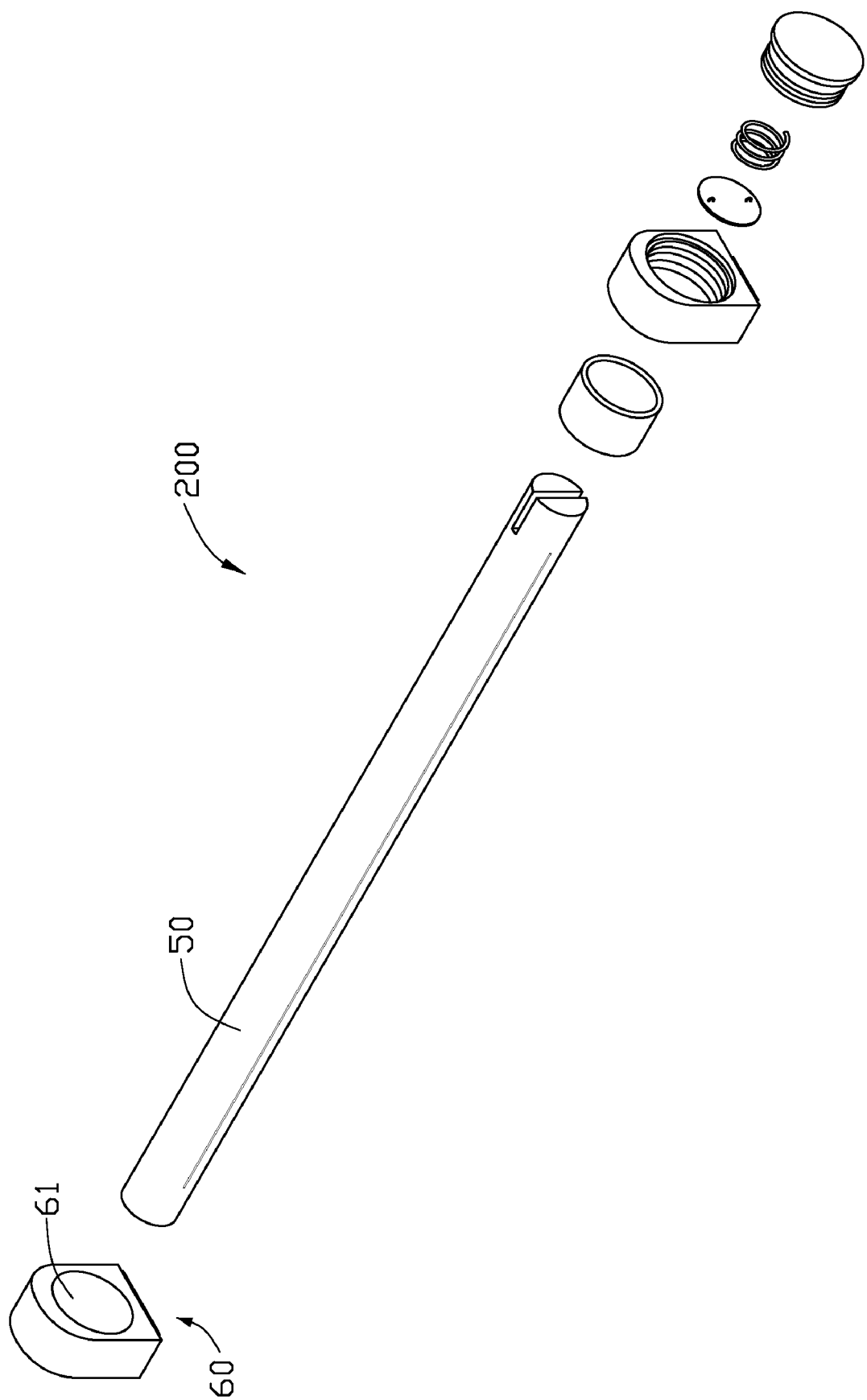
FIG. 3 is an exploded, isometric view of a second embodiment of a screen protecting assembly without a curtain.

Referring to FIG. 3, a second embodiment of a screen protecting assembly 200 is similar to the first embodiment of the screen protecting assembly 100, except that one connecting subassembly 30 is replaced by a connecting base 60 for supporting a pivot shaft 50. The connecting base 60 defines a receiving groove 61.

Figure 4:
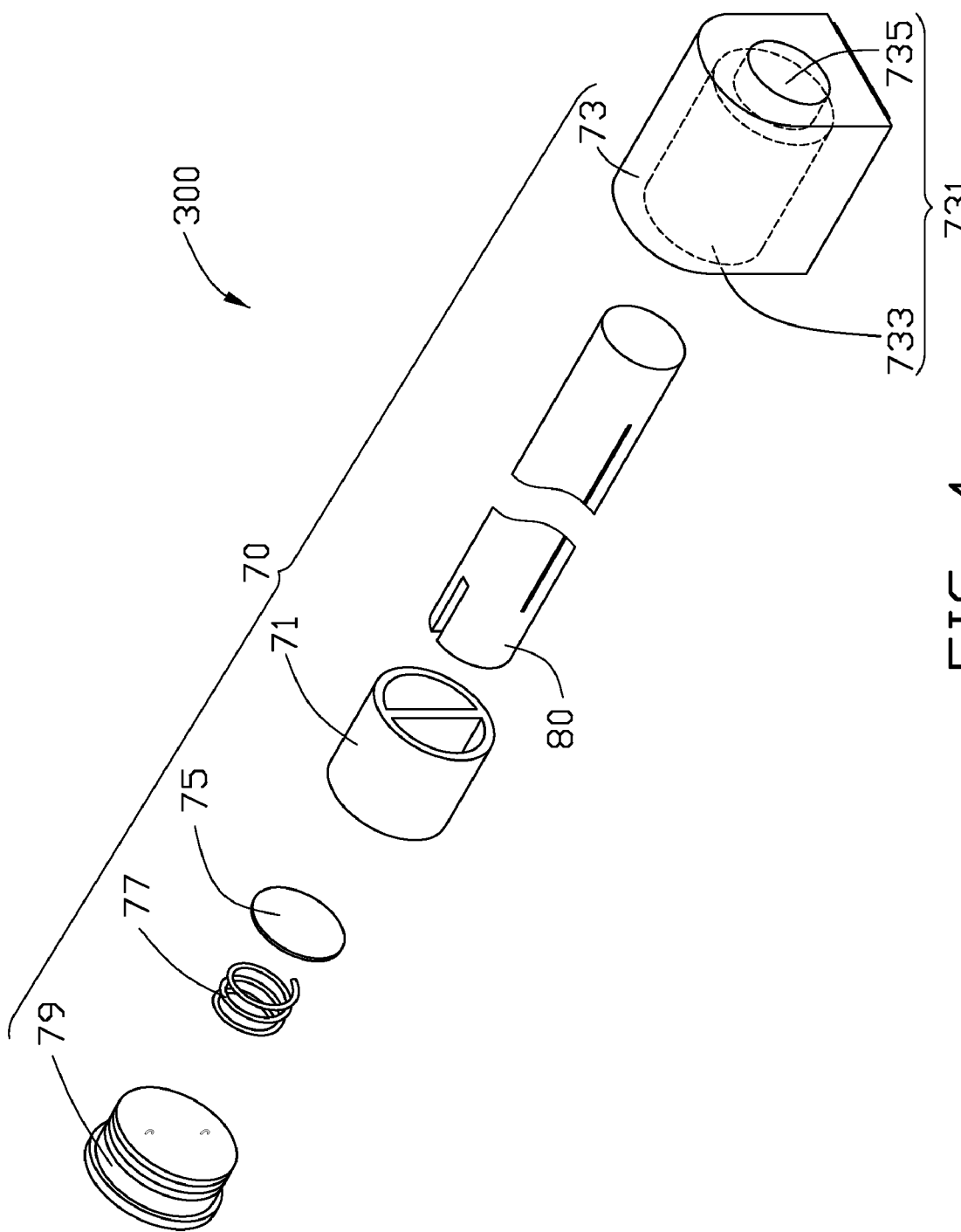
FIG. 4 is an exploded, isometric view of a third embodiment of a screen protecting assembly without a curtain.

Referring to FIG. 4, a third embodiment of a screen protecting assembly 300 is similar to the first embodiment of the screen protecting assembly 100, except that the screen protecting assembly 300 only includes one connecting subassembly 70. The connecting subassembly 70 includes a rotating member 71, a base 73, a resisting member 75, an elastic member 77, and a fastening member 79. The base 73 defines an assembling hole 731. The assembling hole 731 includes a first hole 733 corresponding to a rotating member 71 and a second hole 735 corresponding to a pivot shaft 80. The connecting subassembly 70 is positioned on a side of a top of an electronic device (not shown). A cushion (not shown) may coil on the pivot shaft 80.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A screen protecting assembly for an electronic device, comprising:
   a pivot shaft;
   at least one connecting subassembly positioned on the electronic device, the at least one connecting subassembly has a base and a rotating member rotatably received in the base, wherein the rotating member is non-rotatably connected to the pivot shaft, the base defines an assembling hole, and the rotating member is rotatably received in the assembling hole of the base; and
   a cushion positioned on the pivot shaft, wherein when the rotating member is rotated in a first direction, the cushion unfolds to cover a screen of the electronic device; when the rotating member is rotated in a second direction opposite to the first direction, the cushion coils on the pivot shaft so that the screen of the electronic device is exposed;
   wherein the pivot shaft define a positioning cutout in an end of the pivot shaft, the rotating member comprises a sleeve and a positioning piece formed in the sleeve, the positioning piece extends along an axis of the sleeve and only connects opposite sides of the sleeve, and the positioning piece engages in the positioning cutout of the pivot shaft; the at least one connecting subassembly further comprises a fastening member, an elastic member, and a resisting member; the fastening member comprises a main body and a flange formed on an end of the main body; the main body is engaged in the assembling hole opposite to the pivot shaft; the elastic member and the resisting member are received in the assembling hole and between the fastening member and the pivot shaft.

2. The screen protecting assembly of claim 1, wherein the fastening member comprises at least one hook for engaging with an end of the elastic member; the resisting member comprises at least one hook for engaging with the other end of the elastic member.

3. The screen protecting assembly of claim 1, wherein the elastic member is a compression spring.

4. The screen protecting assembly of claim 1, wherein the at least one connecting subassembly comprises two connecting subassemblies positioned on opposite sides of a top of the electronic device.

5. The screen protecting assembly of claim 1, wherein the cushion is a picture or a photograph.

6. The screen protecting assembly of claim 1, wherein the main body defines a threaded portion.

* * * * *